(12) United States Patent
Gerns

(10) Patent No.: US 7,959,960 B2
(45) Date of Patent: *Jun. 14, 2011

(54) MANUFACTURED MEAT AND METHOD OF PRODUCTION THEREOF

(75) Inventor: Edwin Gerns, Geebung (AU)

(73) Assignee: ARG Trading Pty Ltd, Geebung (AU)

( * ) Notice: Subject to any disclaimer, the term of this patent is extended or adjusted under 35 U.S.C. 154(b) by 24 days.

This patent is subject to a terminal disclaimer.

(21) Appl. No.: 12/463,916

(22) Filed: May 11, 2009

(65) Prior Publication Data

US 2009/0214727 A1 Aug. 27, 2009

Related U.S. Application Data

(63) Continuation of application No. 10/467,203, filed as application No. PCT/AU02/00139 on Feb. 12, 2002.

(30) Foreign Application Priority Data

Feb. 12, 2001 (AU) ........................................ PR3026
Mar. 20, 2001 (AU) ........................................ PR3844

(51) Int. Cl.
*A23L 1/31* (2006.01)
*B65B 25/06* (2006.01)

(52) U.S. Cl. ........................................ 426/129; 426/574

(58) Field of Classification Search .................. 426/105, 426/129, 574, 641, 513

See application file for complete search history.

(56) References Cited

U.S. PATENT DOCUMENTS

| 1,971,460 | A | 8/1934 | McKee |
| 2,419,424 | A | 4/1947 | Staab |
| 2,553,113 | A | 5/1951 | Ruggiero |
| 2,789,908 | A | 4/1957 | Doepken |
| 3,307,955 | A | 3/1967 | Pirtle |
| 4,806,373 | A | 2/1989 | Stumpf et al. |
| 5,328,712 | A | 7/1994 | Stevison et al. |
| 6,027,756 | A | 2/2000 | Spratt et al. |
| 6,168,822 | B1 | 1/2001 | Reicks et al. |
| 2004/0062850 | A1 | 4/2004 | Gerns |

FOREIGN PATENT DOCUMENTS

FR 2728435 A1 6/1996

OTHER PUBLICATIONS

Guyon, R, Supplementary European Search Report for European Patent Application No. 02 70 0010 prepared May 10, 2005.
Lawrie, R.A. Lawrie's Meat Science, William Andrew Publishing 1998, pp. 146, 152, 192, 193, 236 and 240.

(Continued)

*Primary Examiner* — Kelly Bekker
(74) *Attorney, Agent, or Firm* — Peters Verny, LLP

(57) ABSTRACT

Methods for producing meat products with a bone flavor, and the meat products so produced, are provided. In exemplary methods a cured bone is secured with a binding to a de-boned and cured leg of meat, such as a leg of ham. The bone can be the one removed from the de-boned leg, or can be a substitute bone. The de-boned leg and the bone can be cured together or cured separately with the same or different cures prior to being secured together. An exemplary meat product comprises a de-boned leg of ham having an exterior, a bone positioned against the exterior, and a binding that secures the bone to the exterior of the leg of ham.

6 Claims, 2 Drawing Sheets

OTHER PUBLICATIONS

In Japanese Patent Application 2002-563784: Instructions to JP Agent in response to first office action (believed to be an accurate representation of the arguments and amendments filed), May 2008, pp. 1-2.

In Japanese Patent Application 2002-563784: Translation of 2nd exam report, Aug. 5, 2009. pp. 1-3.

In Japanese Patent Application 2002-563784: Translation of response filed Nov. 11, 2009, pp. 1-2.

In Japanese Patent Application 2002-563784: Translation of Final office action, Apr. 27, 2010. pp. 1-3.

In Japanese Patent Application 2002-563784: Translation of response filed Jul. 23, 2010, pp. 1-4.

MANUFACTURED MEAT AND METHOD OF PRODUCTION THEREOF

CROSS-REFERENCE TO RELATED APPLICATIONS

This application is a continuation of U.S. patent application Ser. No. 10/467,203 filed on Aug. 5, 2003 and titled "Manufactured Meat and Method of Production Thereof," which is a continuation under 35 USC §371 of PCT/AU02/00139 filed on Feb. 12, 2002 and also titled "Manufactured Meat and Method of Production Thereof" which claimed the benefit of Australian applications PR3026 filed on Feb. 12, 2001 and PR 3844 filed on Mar. 20, 2001. Each of the applications previously noted is incorporated herein by reference.

FIELD OF THE INVENTION

This invention relates to manufactured meat and methods of production thereof.

This invention has particular application to the production of cooked ham, and the invention will be described hereinafter with reference to this application. However, it will be understood by persons skilled in the art that this invention may find application in the production of other manufactured meats such as bacons and other smoked or cured meats.

BACKGROUND OF THE INVENTION

It is generally considered that leg ham on the bone is a superior product to boneless ham. In the production of boneless ham and other cured cuts, the brined and cured meat is boned out and the resulting cut is then usually wrapped in a cook-in wrap of polymer or net, or a smoke permeable cook-in wrap for hams or the like. The product is then steam cooked, smoked to cook, or is partially cooked by smoking followed by a heat cooking in a cook-in package, as the product requires. The resulting product is relatively easier to carve than the bone-in product, and is appreciated by the market as having less waste. However, the boneless products are perceived to have inferior eating quality. Most persistently, the impression of the market is that the flavour of bone-out hams is of less quality that the flavour of bone-in ham.

SUMMARY

In one aspect the present invention resides broadly in a method of production of manufactured meat including the steps of:
providing an open-boned, boned-out cut;
separately curing the cut and a bone;
binding the cured bone on the outside of the cut in intimate contact with the flesh of the cut at the recess formed by the open boning thereof with a cook-in binding; and
cooking the bound cut.

DETAILED DESCRIPTION

Conventional wisdom has it that the superior flavour of ham on the bone is predicated by the tissue-bound intimacy of the bone to the flesh throughout the curing and cooking process in terms of flavour development and thermal transfer through the bone. It has been suprisingly determined that, contrary to this conventional wisdom, essentially the same quality and flavour may be produced by a process in accordance with the present invention.

Figure 1:
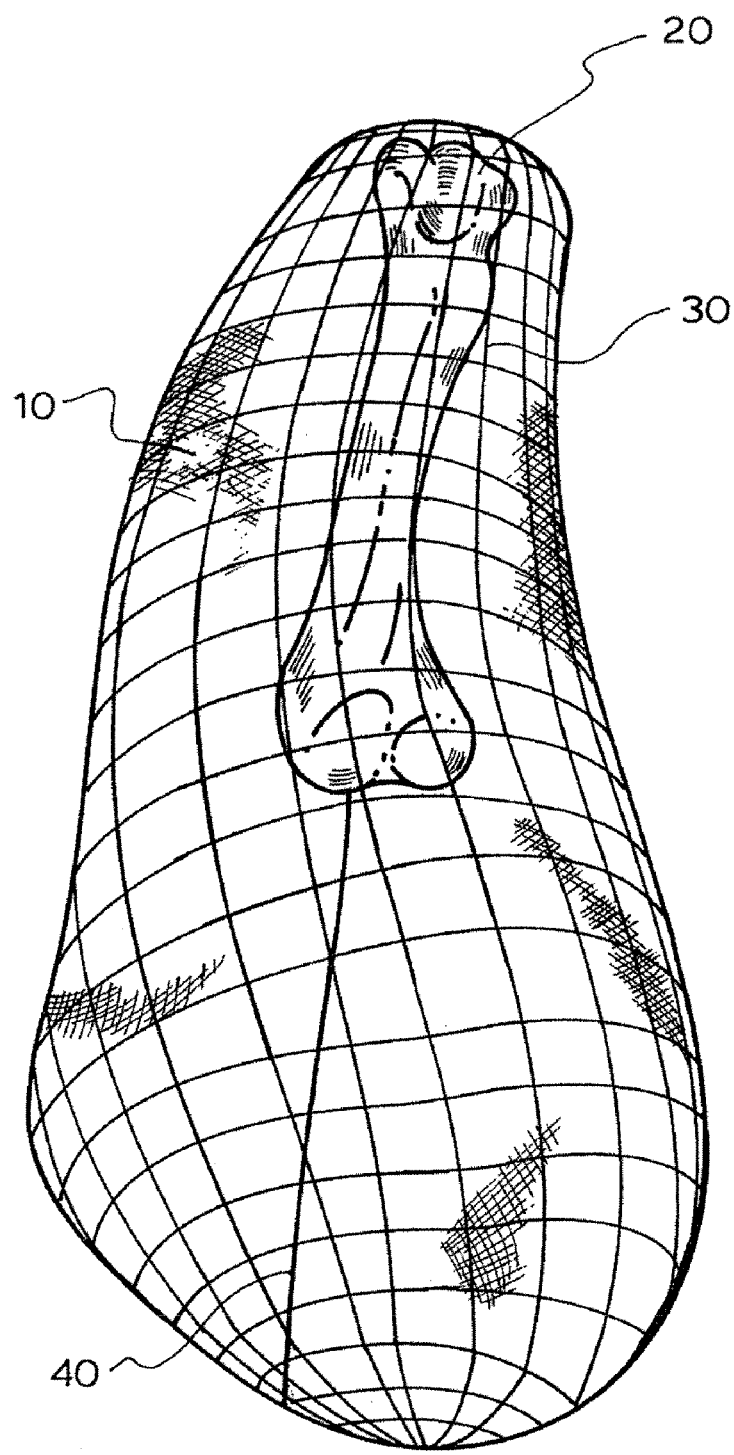
FIG. 1 is a side elevation view of a leg of ham with a bone bound thereto in accordance with one preferred embodiment of the present invention.
Figure 2:
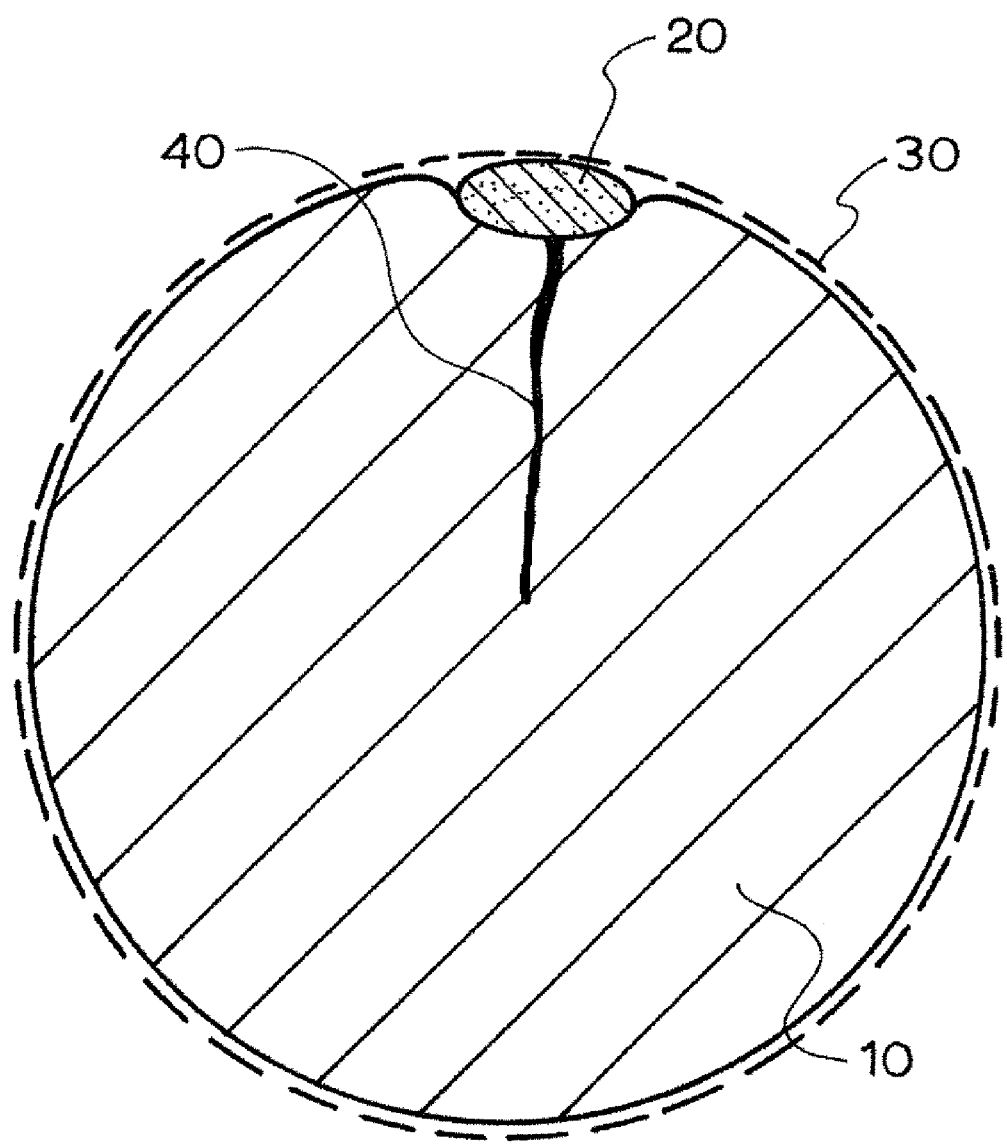
FIG. 2 is a cross sectional plan view of the leg of ham and bone of FIG. 1.

Referring to FIGS. 1 and 2, the cut may be any meat cut 10 requiring to be boned. The bone 20 may be sourced from the cut 10 or may be from elsewhere on the same or another beast.

The boneless cut 10 may be reshaped prior to curing. For example, the reshaping may be performed by mechanical stretching or rehanging. In the case of hams or the like, when the bone 20 is removed the uncured or cured ham may advantageously be rehung or otherwise stretched. The ham muscle may be readily lengthened since there is no ham bone or associated tendons to support the muscle in shape. This hanging or stretching creates the appearance of a larger, longer and/or more streamlined appearance to the product.

The cure may be any suitable cure including but not limited to brining or pickling, sugar cure or the like, with or without saltpetre or other curing excipients. The cure may be the same or different as between the cut and the bone or bone substitute. Preferably, the cure for at least the cut is selected from cures conventionally used to cure the cut.

The binding 30 may be by any suitable means at least in part dictated by the cooking process. The binding 30 is advantageously selected from conventional cook-in bindings. For example, the binding 30 may be by means of a natural or synthetic casing or film, net or cloth.

The cooking may be by means of one or more of smoking, thermal cooking such as roasting, steaming or boiling, or the like.

The intimate contact between the cured bone and the cured flesh may comprise reinsertion of the bone into the cavity of the boned cut.

The intimacy of contact between the flesh and the bone 20 may be supplemented by the addition of a substance selected to enhance diffusion of the principles responsible for bone-enhanced flavour. For example, the bone 20 and/or cut 10 may be treated with a food acid or the like. The additive may also include or comprise a flavouring excipient such as a fruit juice, coulis or the like.

In a yet further aspect this invention resides broadly in a manufactured meat product when produced by any one of the foregoing methods of the invention.

The invention will be further described with reference to a preferred embodiment of the present invention, in accordance with the following example.

EXAMPLE

Three hams were selected for manufacture. Two were boned out and one was left on the bone. The three hams and the excised bones were pickled in brine and saltpetre in the conventional manner. The brining solution was supplemented with sugar and pineapple juice.

The cured bones were laid adjacent the excision slit 40 (see FIGS. 1 and 2) in the cut in intimate contact with the flesh of one of the hams, and the whole cut was secured by cook-in elastic netting 30 (FIG. 1). The second boned out ham and the bone-in ham were similarly bound in netting to eliminate any variation in cooking occasioned by the netting. The respective cuts were then identically smoked to a cooked state in the conventional manner.

On a blind tasting, the boneless product was picked as such by a statistically significant proportion of tasters, whereas the bone-in ham and ham in accordance with the present invention were adjudged to be ham on the bone by a majority of tasters, with no statistically significant variation of opinion between the two products.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

What is claimed is:

1. A method for manufacturing a bone-out leg meat product with a bone-in flavour, comprising:
   boning out a leg cut of meat to form a bone-out leg cut, the boning out incision forming a recess along the side of the leg cut;
   curing the bone-out leg cut and the bone;
   reshaping the cured bone-out leg cut;
   placing a cured bone in contact with exposed flesh of the incision on the exterior surface of the reshaped, cured bone-out leg cut;
   securing the cured bone to the reshaped, cured bone-out leg cut with a cook-in binding; and
   cooking the bound leg cut and bone.

2. The method of claim 1, wherein the step of curing includes using different cures for the leg cut of meat and the cured bone.

3. The method of claim 1, wherein said reshaping comprises stretching the cured bone-out leg cut.

4. The method of claim 1, wherein the leg cut of meat is stretched prior to curing the leg cut of meat.

5. The method of claim 1, wherein the leg cut of meat is a leg of pork.

6. A meat product, comprising:
   a de-boned leg of ham having an exterior, a boning out incision forming a recess along the side of the leg of ham;
   a bone positioned against the exterior of the leg of ham; and
   a cook-in elastic netting securing said bone to the exterior of the leg of ham.

* * * * *